(12) United States Patent
Wang (10) Patent No.: US 11,232,922 B2
(45) Date of Patent: Jan. 25, 2022

(54) POWER SUPPLY CIRCUIT, RELAY DEVICE AND POWER OVER ETHERNET SYSTEM

(71) Applicant: HANGZHOU HIKVISION DIGITAL TECHNOLOGY CO., LTD., Hangzhou (CN)

(72) Inventor: Weimin Wang, Hangzhou (CN)

(73) Assignee: HANGZHOU HIKVISION DIGITAL TECHNOLOGY CO., LTD., Hangzhou (CN)

(*) Notice: Subject to any disclaimer, the term of this patent is extended or adjusted under 35 U.S.C. 154(b) by 0 days.

(21) Appl. No.: 16/768,557

(22) PCT Filed: Aug. 3, 2018

(86) PCT No.: PCT/CN2018/098538
§ 371 (c)(1),
(2) Date: May 29, 2020

(87) PCT Pub. No.: WO2019/109653
PCT Pub. Date: Jun. 13, 2019

(65) Prior Publication Data
US 2020/0294746 A1    Sep. 17, 2020

(30) Foreign Application Priority Data

Dec. 6, 2017 (CN) .......... 201721677203.X
Dec. 29, 2017 (CN) .......... 201721919828.2

(51) Int. Cl.
*H01H 47/32* (2006.01)
*H01H 47/14* (2006.01)
*H04L 12/10* (2006.01)

(52) U.S. Cl.
CPC .......... *H01H 47/325* (2013.01); *H01H 47/14* (2013.01); *H04L 12/10* (2013.01)

(58) Field of Classification Search
CPC ....... H01H 47/14; H01H 47/325; H04L 12/10
(Continued)

(56) References Cited

U.S. PATENT DOCUMENTS 7,873,057 B2 * 1/2011 Robitaille ............... H04L 12/50
                                                   370/401
8,705,341 B2 * 4/2014 Robitaille ............... H04L 12/50
                                                   370/216
(Continued)

FOREIGN PATENT DOCUMENTS

CN    1614855    5/2005
CN    1770890    5/2006
(Continued)

OTHER PUBLICATIONS

International Search Report and Written Opinion issued in corresponding PCT Application No. PCT/CN2018/098538, dated Oct. 12, 2018 (English translation provided).
(Continued)

*Primary Examiner* — Yemane Mehari
(74) *Attorney, Agent, or Firm* — Norton Rose Fulbright US LLP (57) ABSTRACT

A power supply circuit, a relay device and a Power over Ethernet system related to the electronic technical field are provided. In the power supply circuit, each rectifier module has its positive output end connected to a positive supply pin, and a negative output end connected to a first end of a switch control module. The positive supply pin is connected to a positive terminal of a relay circuit in the relay device. The switch control module has a second end connected to a negative supply pin, and a control end connected to the positive supply pin. The negative supply pin is connected to a negative terminal of the relay circuit. The switch control module allows conduction between the first end and the
(Continued)

second end when the rectifier module outputs a voltage greater than a preset threshold.

11 Claims, 4 Drawing Sheets

(58) Field of Classification Search
  USPC .......................................................... 361/190
  See application file for complete search history.

(56) References Cited

U.S. PATENT DOCUMENTS

| | | | | |
|---|---|---|---|---|
| 8,873,370 | B2* | 10/2014 | Robitaille | ........... G06F 11/0709 |
| | | | | 370/216 |
| 9,189,036 | B2* | 11/2015 | Ghoshal | .................. G06F 1/189 |
| 2003/0164359 | A1 | 9/2003 | Norris et al. | |
| 2007/0278857 | A1 | 12/2007 | Robbins | |
| 2009/0323717 | A1* | 12/2009 | Landry | ................ H03K 17/689 |
| | | | | 370/463 |
| 2011/0080918 | A1* | 4/2011 | Robitaille | ............... H04L 25/02 |
| | | | | 370/401 |
| 2012/0218879 | A1* | 8/2012 | Robitaille | ............... G06F 1/266 |
| | | | | 370/216 |
| 2014/0348160 | A1* | 11/2014 | Robitaille | ............... H04L 12/10 |
| | | | | 370/360 |
| 2015/0146459 | A1* | 5/2015 | Du | .......................... H02H 9/04 |
| | | | | 363/53 |
| 2016/0313776 | A1* | 10/2016 | Robitaille | ............... H04L 12/10 |

FOREIGN PATENT DOCUMENTS

| | | |
|---|---|---|
| CN | 105375827 | 3/2016 |
| CN | 206250959 | 6/2017 |
| CN | 207460205 | 6/2018 |
| CN | 207603637 | 7/2018 |

OTHER PUBLICATIONS

Extended European Search Report issued in Corresponding European Application No. 18885992.0, dated Dec. 8, 2020.

* cited by examiner

POWER SUPPLY CIRCUIT, RELAY DEVICE AND POWER OVER ETHERNET SYSTEM

CROSS REFERENCE TO RELATED APPLICATIONS

The present application is a national phase application under 35 U.S.C. § 371 of International Application No. PCT/CN2018/098538, filed Aug. 3, 2018, which claims the benefit of priority to Chinese patent application No. 201721677203.X filed with the China National Intellectual Property Administration on Dec. 6, 2017 and entitled "Power supply circuit, relay device and Power over Ethernet system"; and Chinese patent application No. 201721919828.2 filed with the China National Intellectual Property Administration on Dec. 29, 2017 and entitled "Network system and network extender", each of which are incorporated herein by reference in their entirety.

TECHNICAL FIELD

The present application relates to the field of electronic technology, in particular to a power supply circuit, a relay device and a Power over Ethernet system.

BACKGROUND

Power over Ethernet (POE) technology refers to the technology of transmitting data signals and providing DC power supply for a network device (such as a network telephone, a WLAN access point or a network switch) through Ethernet twisted pair In the related art, a POE system typically includes a power sourcing equipment (PSE) and a powered device (PD). Both the PSE and the PD can be provided with an RJ45 interface. The RJ45 interface in the PSE can be connected to the RJ45 interface in the PD through a network cable. The PSE can supply power to and exchange data signals with the PD through the network cable.

However, due to the limited transmission distance of data signals in Ethernet (typically, 100 meters), the distance between PSE and PD is limited by the transmission distance of data signals. This results in poor application flexibility of the Power over Ethernet technology.

SUMMARY

The present application provides a power supply circuit, a relay device, and a Power over Ethernet system, with which the problem of poor application flexibility of the Power over Ethernet technology in the related art can be addressed. The technical solutions are as follows.

In a first aspect, a power supply circuit is provided for powering a relay circuit in a relay device. The power supply circuit includes: at least one rectifier module and a switch control module.

Each rectifier module has an input end connected to an input interface of the relay device, a positive output end connected to a positive supply pin, and a negative output end connected to a first end of the switch control module, wherein, the positive supply pin is connected to a positive terminal of the relay circuit.

The switch control module has a second end connected to a negative supply pin, a control end connected to the positive supply pin, wherein, the negative supply pin is connected to a negative terminal of the relay circuit.

The switch control module allows conduction between the first end and the second end when the rectifier module outputs a voltage greater than a preset threshold.

Optionally, the switch control module comprises a switching transistor having a gate connected to the positive supply pin, a source connected to the negative output end, and a drain connected to the negative supply pin.

Optionally, the power supply circuit further includes: a first resistor and a first zener diode.

The first resistor has one end connected to the positive supply pin and the other end connected to a cathode of the first zener diode, and an anode of the first zener diode is connected to the gate of the switching transistor.

Optionally, the switch control module further includes: a second zener diode, a second resistor and a capacitor.

The second zener diode has a cathode connected to the gate of the switching transistor, and an anode connected to the source of the switching transistor.

The second resistor has one end connected to the gate of the switching transistor, and the other end connected to the source of the switching transistor.

The capacitor has one end connected to the gate of the switching transistor, and the other end connected to the source of the switching transistor.

Optionally, the switch control module includes: a powered device integrated chip.

The powered device integrated chip has an under voltage lock out pin connected to the positive supply pin, a return pin connected to the negative supply pin, a negative power pin connected to the negative output end, and a positive power pin connected to the positive supply pin.

The powered device integrated chip leaves a detection pin and a classification pin floating.

Optionally, the switch control module further includes: a third resistor, a fourth resistor and a fifth resistor.

The third resistor has one end connected to the positive supply pin, and the other end connected to the under voltage lock out pin.

The fourth resistor has one end connected to the under voltage lock out pin, and the other end connected to the negative output end.

The fifth resistor has one end connected to a current limiting pin of the powered device integrated chip, and the other end connected to the negative output end.

Optionally, the power supply circuit further includes: a first protection device, a second protection device, and a third protection device.

The first protection device has one end connected to the positive supply pin, and the other end connected to the negative supply pin.

The second protection device has one end connected to the negative output end, and the other end connected to the negative supply pin.

The third protection device has a negative terminal connected to the positive supply pin, and a positive terminal connected to the negative output end.

Optionally, the power supply circuit includes two rectifier modules, and the input interface of the relay device includes eight input pins.

One of the two rectifier modules has an input end connected to four input pins of the input interface, and the other rectifier module has an input end connected to the other four input pins of the input interface.

In a second aspect, a relay device is provided. The relay device includes a relay circuit for forwarding signals, and a power supply circuit as described in the first aspect.

The relay circuit has a positive terminal connected to a positive supply pin of the power supply circuit, and a negative terminal connected to a negative supply pin of the power supply circuit.

Optionally, the relay device further includes a first transformer and a second transformer.

The relay circuit is connected to the input interface of the relay device through the first transformer, and is connected to the output interface of the relay device through the second transformer.

In a third aspect, another relay device is provided. The relay device is used for connecting a first network cable with a second network cable. The relay device includes any of the foregoing power supply circuits, and further includes:

a first PHY chip connected to the first network cable and a second PHY chip connected to the second network cable, a data transmission interface of the first PHY chip is communicatively connected to a data reception interface of the second PHY chip, the data reception interface of the first PHY chip is communicatively connected to the data transmission interface of the second PHY chip, and the power supply circuit is connected to and powers the first PHY chip and the second PHY chip.

Optionally, the first PHY chip is connected to the first network cable through an RJ45 interface, and the second PHY chip is connected to the second network cable through an RJ45 interface.

Optionally, the first PHY chip comprises a first transceiving interface in which the data transmission interface and data reception interface of the first PHY chip are integrated; the second PHY chip comprises a second transceiving interface in which the data transmission interface and data reception interface of the second PHY chip are integrated; and the first transceiving interface is plugged and mated with the second transceiving interface.

Optionally, the first transceiving interface and the second transceiving interface are selected from a group consisting of an RMII interface, a GMII interface, an RGMII interface and a MII interface.

Optionally, the relay device further includes a housing in which the first PHY chip, the second PHY chip, and the power supply circuit are disposed.

Optionally, the relay device further includes an MCU control chip, which is disposed in the housing, connected to the first PHY chip and the second PHY chip, and configured for controlling initialization of the first PHY chip and the second PHY chip and matching a network rate of the first PHY chip with that of the second PHY chip.

Optionally, the first PHY chip is provided with a first MDIO interface connected to the MCU control chip, and the second PHY chip is provided with a second MDIO interface connected to the MCU control chip.

Optionally, the relay device further includes a clock circuit connected to both the first PHY chip and the second PHY chip, the clock circuit is provided in the housing, and is configured for synchronizing data transmission between the first PHY chip and the second PHY chip.

Optionally, the first PHY chip is provided with a first CLKIN interface connected to the clock circuit, and the second PHY chip is provided with a second CLKIN interface connected to the clock circuit.

In a fourth aspect, a Power over Ethernet system is provided. The system includes:

a power sourcing equipment, a powered device and the relay device as described in the second aspect.

The relay device has an input interface connected to the power sourcing equipment, and the output interface of the relay device is connected to the powered device.

Optionally, the system may further include: a first network cable and a second network cable. The first network cable and the second network cable are connected through the relay device as described above.

The beneficial effects of the technical solutions provided by the present application are as follows.

Embodiments of the present application provide a power supply circuit, a relay device, and a Power over Ethernet system. The power supply circuit can convert a received input voltage of uncertain polarity into an input voltage of determined polarity through a rectifier module, and can be controlled, by a switch control module, to stop the delay circuit from working if the input voltage is less than or equal to a preset threshold, without affecting the detection and classification process of the PSE. When the input voltage is greater than the preset threshold, that is, when the PSE is supplying power, the power supply circuit starts to power the relay circuit, so as to implement transmission of power signal and forwarding of data signal.

BRIEF DESCRIPTION OF THE DRAWINGS

In order to more clearly describe the technical solution of the embodiments of the application and the prior art, drawings needed in the embodiments and the prior art will be briefly described below. Obviously, the drawings described below are for only some embodiments of the present application, one of ordinary skills in the art can also obtain other drawings based on these drawings without any creative efforts.

LIST OF REFERENCE NUMERALS

01-power sourcing equipment, 02-relay device, 03-powered device, 10-rectifier module, 20-switch control module, 021-relay circuit, 00-power supply circuit, 100-first network cable, 200-second network cable, 400-first PHY chip, 410-

RJ45 interface, 420-first transceiving interface, 421-data transmission interface, 422-data reception interface, 430-first RMII interface, 440-first MDIO interface, 450-first CLKIN interface, 500-second PHY chip, 510-RJ45 interface, 520-second transceiving interface, 521-data transmission interface, 522-data reception interface, 530-second RMII interface, 540-Second MDIO interface, 550-second CLKIN interface, 600-housing, 700-MCU control chip, 800-clock circuit.

DETAILED DESCRIPTION

In order to make objectives, technical solutions and advantages of the present application more apparent, the present application now will be described in detail with reference to the accompanying drawings and the detailed description. Obviously, the embodiments described are only some of the embodiments of the present application instead of all the embodiments. All further embodiments obtained by those of ordinary skills in the art based on the embodiments herein without any creative efforts are within the scope of the present application.

Figure 1:
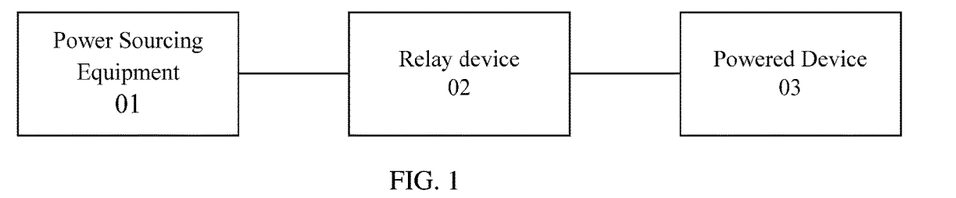
FIG. 1 is a schematic structural diagram of a Power over Ethernet system according to an embodiment of the present application.

FIG. 1 is a schematic structural diagram of a POE system according to an embodiment of the present application. As shown in FIG. 1, the POE system may include a power sourcing equipment 01, a relay device 02, and a powered device 03. The power sourcing equipment 01 can supply power to the relay device 02 and the powered device 03, and exchange data with the powered device 03 through the relay device 02. The power sourcing equipment 01 can be a switch or network video recorder (NVR) that supports POE power supply. The powered device 03 can be an Internet Protocol (IP) telephone, a wireless local area network access point or a network camera. The relay device 02 can be a device for forwarding data signals such as a network extender or a repeater. The transmission distance of data signals between the power sourcing equipment 01 and the powered device 03 can be extended through the relay device. The relay device 02 is provided with a relay circuit, through which data signals are forwarded.

Before supplying power to the powered device, the power sourcing device needs to detect the powered device in the POE system and determine classification thereof. In a detection phase, the power sourcing equipment can first output a lower detection voltage, typically below 10.2 volts (V), and then determine, according to detected capacitance and resistance, whether there is a powered device under a POE standard protocol (for example, IEEE 802.3af) in the POE system. If such a powered device is not detected, the power sourcing equipment does not supply power. If a powered device under POE standard protocol is detected, the power sourcing equipment can enter a classification phase. In the classification phase, the power sourcing equipment can increase the detection voltage (typically, 15.5V to 20.5V), and determine a power level of the powered device according to a received response current for classification confirmation (the power sourcing equipment can receive the response current through the relay device). After this, the power sourcing equipment can output 48V DC to the powered device.

In related art, in order to extend the transmission distance of data signals between devices in an Ethernet system, a relay device is usually introduced between two devices. However, since the relay device typically does not support POE standard protocol, the relay device and a next-stage end device connected to the relay device have to be powered by individual power adapters instead of through POE technology. This increases wiring cost. If the relay device is designed to support the POE standard protocol, the power sourcing equipment may take the relay device as a powered device during the detection process, and thus cannot supply power to the next-stage end device connected to the relay device. As such, the end device on the next stage still has to be powered by a power adapter. This results in a higher wiring cost.

In the POE system provided by the embodiment of the present application, a power supply circuit of a relay device can power a relay circuit in the relay device with power from the power sourcing equipment, without affecting the detection and classification by the power sourcing equipment. In this way, data signals are forwarded, and a normal power supply to the powered device by the power sourcing equipment can be ensured.

Figure 2:
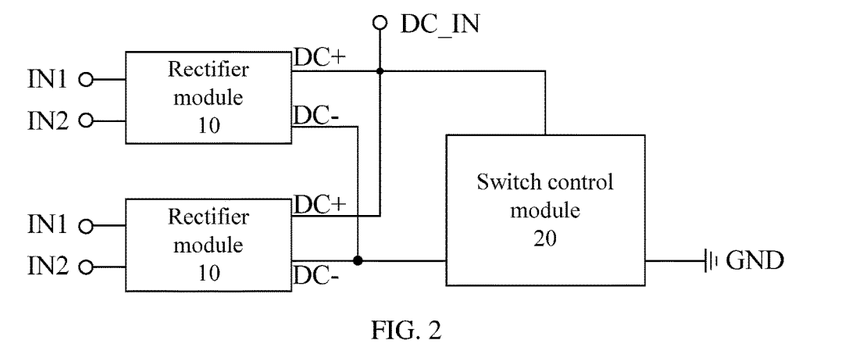
FIG. 2 is a schematic structural diagram of a power supply circuit according to an embodiment of the present application.

FIG. 2 is a schematic structural diagram of a power supply circuit according to an embodiment of the present application. The power supply circuit may be configured in the relay device 02 as shown in FIG. 1 and supply power to the relay circuit of the relay device 02. As shown in FIG. 2, the power supply circuit may include at least one rectifier module 10 and a switch control module 20. In one case, the power supply circuit may further include a positive supply pin DC_IN and a negative supply pin GND. In another case, the positive supply pin DC_IN and the negative supply pin GND may also be pins in other components of the relay device. Embodiments are not limited in this aspect.

Figure 3:
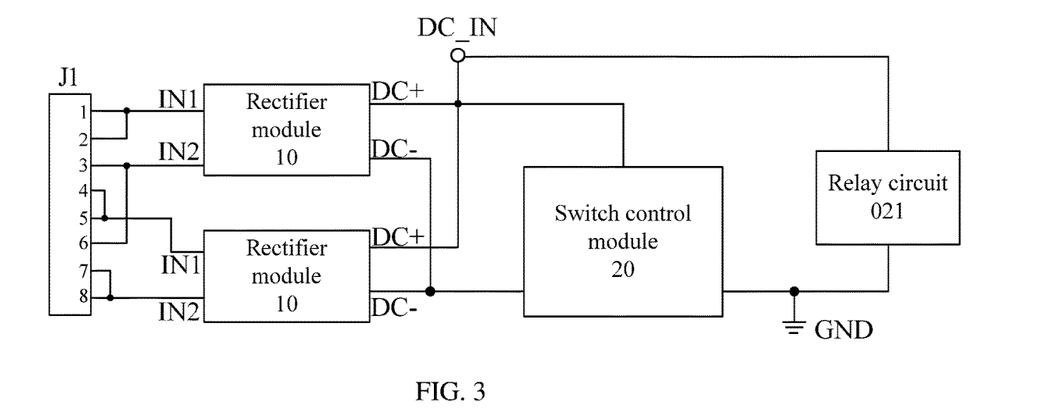
FIG. 3 is a schematic structural diagram of a delay device according to an embodiment of the present application.

FIG. 3 is a schematic structural diagram of a relay device according to an embodiment of the present application. As shown in FIG. 2 and FIG. 3, the input end of each rectifier module 10 may be connected to an input interface J1 of the relay device 02. The positive output end DC+ of each rectifier module 10 is connected to the positive supply pin DC_IN, and the negative output end DC− of each rectifier module 10 is connected to the first end of the switch control module 20. Each rectifier module 10 can rectify the received current (for example, rectify the direction of the current), so as to convert an input voltage of a uncertain polarity into an input voltage of a determined polarity. The rectified current is output to the switch control module 20. Each rectifier module 10 may be a bridge rectifier, for example, composed of a plurality of bridge-connected diodes.

The second end of the switch control module 20 is connected to a negative supply pin GND, and a control end of the switch control module 20 is connected to the positive supply pin DC_IN. The positive supply pin DC_IN is connected to the positive terminal of the relay circuit 021 in the relay device 02, and the negative supply pin GND is connected to the negative terminal of the relay circuit 021. The relay circuit 021 refers to a circuit in the delay device used for relaying and forwarding signals.

The switch control module 20 can allow conduction between the first end and the second end when a voltage output by the rectifier module 10 is greater than a preset threshold, such that the negative output end DC− of the rectifier module 10 is conductively coupled to the negative supply pin GND. In this way, the positive supply pin DC_IN, the relay circuit 021, and the negative supply pin GND can form a current loop, so that the power supply circuit can supply power to the relay circuit 021, and the relay device can forward signals through the relay circuit 021.

The control end of the switch control module 20 is connected to the positive output end of the rectifier module 10. That is, the voltage output by the rectifier module 10 is applied to the control end. When the voltage is greater than a preset threshold, conduction is allowed between the first end and the second end of the switch control module 20.

It should be noted that, in the embodiment of the present application, the preset threshold may be greater than or equal to the detection voltage provided by the PSE during the detection and classification process, and may be less than the power supply voltage provided by the power sourcing equipment when it normally supplies powers. That is, during the detection and classification process by the PSE, the switch control module 20 remains in an off state, and the power supply circuit does not supply power to the relay circuit 021. In this case, the relay device serves only as a wire. This ensures proper detection and classification of the powered device by the power sourcing equipment. When the power sourcing equipment starts to supply power to the powered device, the switch control module 20 can conductively couple the negative output end DC− of the rectifier module 10 to the negative supply pin GND, such that the power supply circuit can supply power to the relay circuit, and normal forwarding of data signals by the relay device between the power sourcing equipment and the powered device is allowed.

In summary, an embodiment of the present application provides a power supply circuit. When the voltage output by the power sourcing equipment is less than or equal to a preset threshold, the power supply circuit does not supply power to the relay circuit, so as to avoid the impact on the detection and classification by the power sourcing equipment. When the voltage output by the power sourcing equipment is greater than a preset threshold, that is, when the power sourcing equipment starts to supply power to the powered device, the power supply circuit starts to supply power to the relay circuit, so as to ensure that the relay circuit can normally forward data signals from the power sourcing equipment to the powered device. Therefore, the transmission distance of data signals between the power sourcing equipment and the powered device in the POE system can be effectively extended and the application flexibility of the POE technology can be improved without increasing a power wiring.

Figure 4:
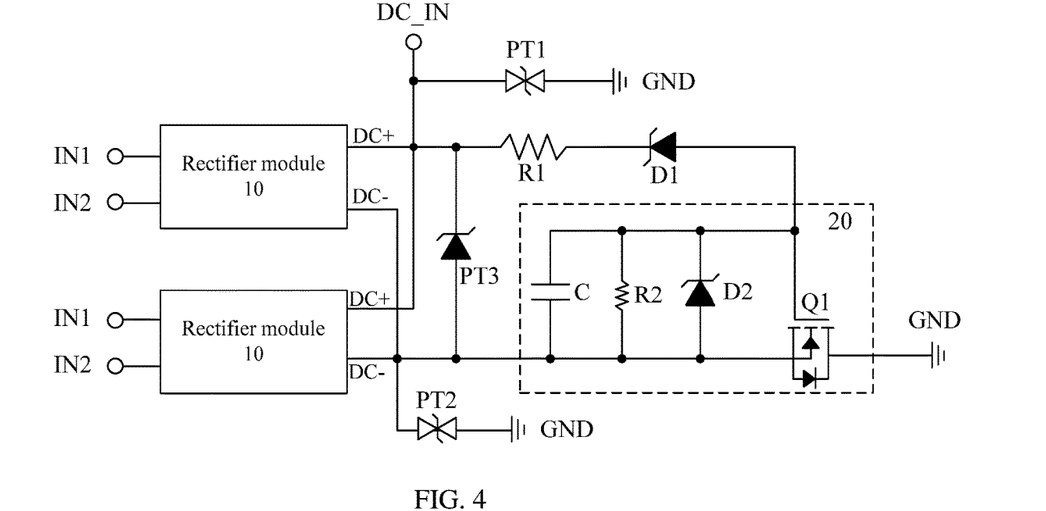
FIG. 4 is a schematic structural diagram of another power supply circuit according to an embodiment of the present application.

In one optional implementation of the present application, as shown in FIG. 4, the switch control module 20 may include a switching transistor Q1.

The gate of the switching transistor Q1 is connected to the positive supply pin DC_IN, the source of the switching transistor Q1 is connected to the negative output end DC−, and the drain of the switching transistor Q1 is connected to the negative supply pin GND.

In the embodiment of the present application, the switching transistor Q1 may be a metal-oxide-semiconductor field-effect transistor (MOSFET), or a triode. The preset threshold may be greater than or equal to a turn-on voltage of the switching transistor Q1. Therefore, during the normal power supply process of the power sourcing equipment, the voltage applied by the rectifier module 10 to the gate of the switching transistor Q1 is greater than the turn-on voltage. The switching transistor Q1 turns on, and conductively couple the negative supply pin GND with the negative output end DC− of the rectifier module 10. The power supply circuit can thus supply power to the relay circuit. The relay device can then normally forward data signals. During the detection and classification process by the power sourcing equipment, the voltage applied by the rectifier module 10 to the gate of the switching transistor Q1 is not greater than the turn-on voltage. The switching transistor Q1 is in an off state, and the power supply circuit cannot supply power to the relay circuit 021. The relay device cannot affect the detection and classification in this case.

Furthermore, as shown in FIG. 4, the power supply circuit may further include: a first resistor R1 and a first zener diode D1.

One end of the first resistor R1 is connected to the positive supply pin DC_IN, the other end of the first resistor R1 is connected to the cathod of the first zener diode D1, and the anode of the first zener diode D1 is connected to gate of the switching transistor Q1.

The first resistor R1 may have a resistance of 10 k-ohms (Ku). The first resistor R1 is a current limiting resistor, which may limit the current output from the rectifier module 10 to the switching transistor Q1. The first zener diode D1 may be turned on when the voltage output by the rectifier module 10 is greater than a preset threshold, and remain in an off state when the voltage output by the rectifier module 10 is not greater than a preset threshold. This ensures that the switching transistor Q1 would not turn on in error during the detection and classification phase. Correspondingly, the preset threshold may be a stabilized voltage of the first zener diode D1. For example, for a first zener diode D1 with a stabilized voltage of 24V, the preset threshold may be 24V.

During the power supply process, when the voltage output by the rectifier module 10 is greater than a voltage drop across the first resistor R1 and the first Zener diode D1, and greater than the turn-on voltage of the switching transistor Q1, the switching transistor Q1 can be normally turned on.

Continuing with FIG. 4, the switch control module 20 may further include: a second Zener diode D2, a second resistor R2, and a capacitor C.

The cathode of the second zener diode D2 is connected to the gate of the switching transistor Q1, and the anode of the second zener diode D2 is connected to the source of the switching transistor Q1. The second zener diode D2 is used for clamping the voltage between the gate and the source of the transistor Q1, and the second zener diode D2 may be 12V zener diode.

One end of the second resistor R2 is connected to the gate of the switching transistor Q1, and the other end of the second resistor R2 is connected to the source of the switching transistor Q1. The second resistor R2 may have a resistance value of 220 KΩ. The second resistor R2 is used for controlling the gate-source voltage (i.e., the voltage difference between the gate and the source) of the switching transistor Q1 to 0 in an initial state, so as to ensure that the switching transistor Q1 remains in the off state.

One end of the capacitor C is connected to the gate of the switching transistor Q1, and the other end of the capacitor C is connected to the source of the switching transistor Q1. The capacitor C can be used for adjusting a gate voltage and a source voltage of the switching transistor Q1 to slow down the turn on rate of the switching transistor to avoid a fast change of the source voltage of the switching transistor Q. As such, activation of an overcurrent protection function of the power sourcing equipment due to current surge as a result of a fast turning on. The capacitor C may have a capacitance value of about 100 nanofarads (nF).

Figure 5:
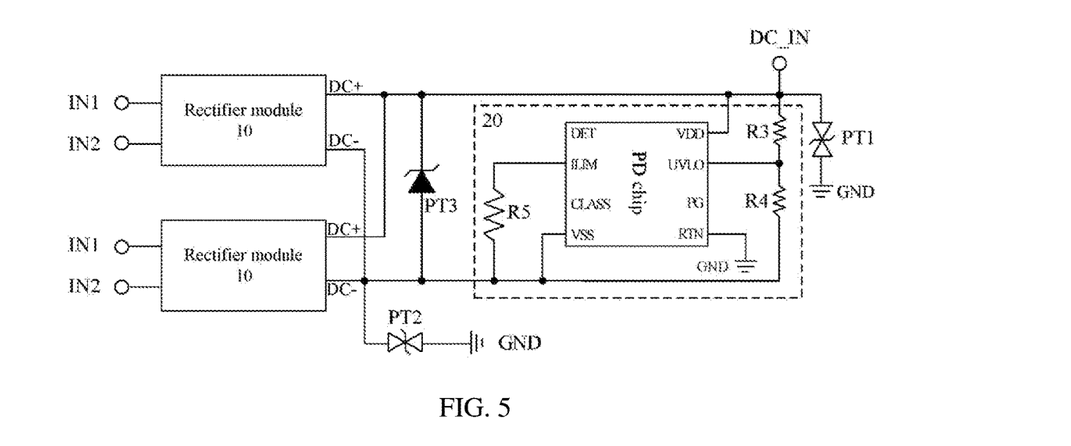
FIG. 5 is a schematic structural diagram of yet another power supply circuit according to an embodiment of the present application.

In another implementation of the present application, as shown in FIG. 5, the switch control module 20 may include a powered device integrated chip, that is, a PD chip.

An under voltage lock out (UVLO) pin of the PD chip is connected to the positive supply pin DC_IN, and a return pin RTN of the PD chip is connected to the negative supply pin GND. A negative power pin VSS of the PD chip is connected to the negative output end DC−, and a positive power pin VDD of the PD chip is connected to the positive supply pin DC_IN. A detection pin DET, a classification pin CLASS and a Power Good (PG) pin of the PD chip are left floating.

The PD chip can allow conduction between the return pin RTN and the negative power pin VSS when the voltage detected by the UVLO pin is greater than a preset threshold. As such, the negative output end DC− and the negative supply pin GND can be conductively coupled. For example, a switching transistor may be integrated in the PD chip, having a gate connected to the UVLO pin, a source connected to the negative power pin VSS, and a drain connected to the return pin RTN.

The detection pin DET of the PD chip can feed back a detection signal to the power sourcing equipment during the detection process of the power sourcing equipment. The classification pin CLASS can respond to the power sourcing equipment with a classification confirmation current during the classification process. If the detection pin DET and the classification pin CLASS of the PD chip are left floating, the PD chip will not be capable of responding to the detection and response classification. In this way, the power sourcing equipment would not wrongly identify the relay device as the powered device and proper detection and classification of the powered device by the power sourcing equipment can thus be ensured.

Optionally, the PD chip used in the embodiment of the present application may be a TPS2376 chip.

Furthermore, as shown in FIG. 5, the switch control module 20 may further include a third resistor R3, a fourth resistor R4, and a fifth resistor R5.

One end of the third resistor R3 is connected to the positive supply pin DC_IN, and the other end of the third resistor R3 is connected to the UVLO pin.

One end of the fourth resistor R4 is connected to the UVLO pin, and the other end of the fourth resistor R4 is connected to the negative output end DC−.

One end of the fifth resistor R5 is connected to the current limiting pin ILIM of the PD chip, and the other end of the fifth resistor R5 is connected to the negative output end DC−.

The voltage of the UVLO can be adjusted by adjusting the resistance values of the third resistor R3 and the fourth resistor R4. The fifth resistor R5 is a current limiting resistor for limiting the output current of the PD chip. For example, the resistance value of the third resistor R3 may be about 3481 KΩ, the resistance value of the fourth resistor R4 may be about 23.71 KΩ, and the resistance value of the fifth resistor R5 may be about 150KΩ.

Optionally, as shown in FIG. 4 and FIG. 5, the power supply circuit may further include: a first protection device PT1, a second protection device PT2, and a third protection device PT3.

One end of the first protection device PT1 is connected to the positive supply pin DC_IN, and the other end of the first protection device PT1 is connected to the negative supply pin GND.

One end of the second protection device PT2 is connected to the negative output end DC−, and the other end of the second protection device PT2 is connected to the negative supply pin GND.

One end of the third protection device PT3 is connected to the positive supply pin DC_IN, and the other end of the third protection device PT3 is connected to the negative output end DC−.

Each of the protection devices may include any one of a zener diode, a bidirectional zener diode, a transient voltage suppressor (TVS) and a semiconductor discharge tube (TSS). The plurality of protection device can improve the anti-static ability and the anti-surge interference ability of the power supply circuit, thereby improving the stability of the power supply circuit.

Optionally, as shown in FIG. 2 to FIG. 5, the power supply circuit may include two rectifier modules 10, and the input interface of the relay device 02 may include eight input pins. In the two rectifier modules 10, one of the two rectifier modules 10 has an input end connected to four input pins of the input interface, and the other rectifier module 10 has an input end connected to the other four input pins of the input interface.

For example, as shown in FIG. 3, the input interface J1 of the relay device may be an RJ45 interface including 8 pins (1 to 8). One rectifier module 10 of the power supply circuit has an input end IN1 connected to a pair of pins (1 and 2) in the input interface J1, and an input end IN2 connected to a pair of pins (3 and 6). The other rectifier module 10 of the power supply circuit has an input end IN1 connected to a pair of pins (4 and 5), and an input end IN2 connected to a pair of pins (7 and 8).

In summary, an embodiment of the present application provides a power supply circuit. When the voltage output by the power sourcing equipment is less than or equal to a preset threshold, the power supply circuit does not supply power to the relay circuit, so as to avoid the impact on the detection and classification by the power sourcing equipment. When the voltage output by the power sourcing equipment is greater than a preset threshold, that is, when the power sourcing equipment starts to supply power to the powered device, the power supply circuit starts to supply power to the relay circuit, so as to ensure that the relay circuit can normally forward data signals between the power sourcing equipment and the powered device. Therefore, the transmission distance of the data signals between the power sourcing equipment and the powered device in the POE system can be effectively extended and the application flexibility of the POE technology can be improved without increasing power wiring.

An embodiment of the present application provides a relay device, referring to FIG. 3, the relay device 02 may include: a relay circuit 021 for forwarding signals, and a power supply circuit. The power supply circuit may be any one of the power supply circuits shown in FIG. 2, FIG. 4 and FIG. 5.

As shown in FIG. 3, the relay circuit 021 may have a positive terminal connected to the positive supply pin DC_IN of the power supply circuit, and a negative terminal connected to the negative supply pin GND of the power supply circuit. When the switch control module 20 in the power supply circuit is controlled to allow conduction between the negative output end DC− of the rectifier module 10 and the negative supply pin GND, the power supply circuit can supply power to the relay circuit 021. As a result, the relay circuit 021 can forward data signals.

Figure 6:
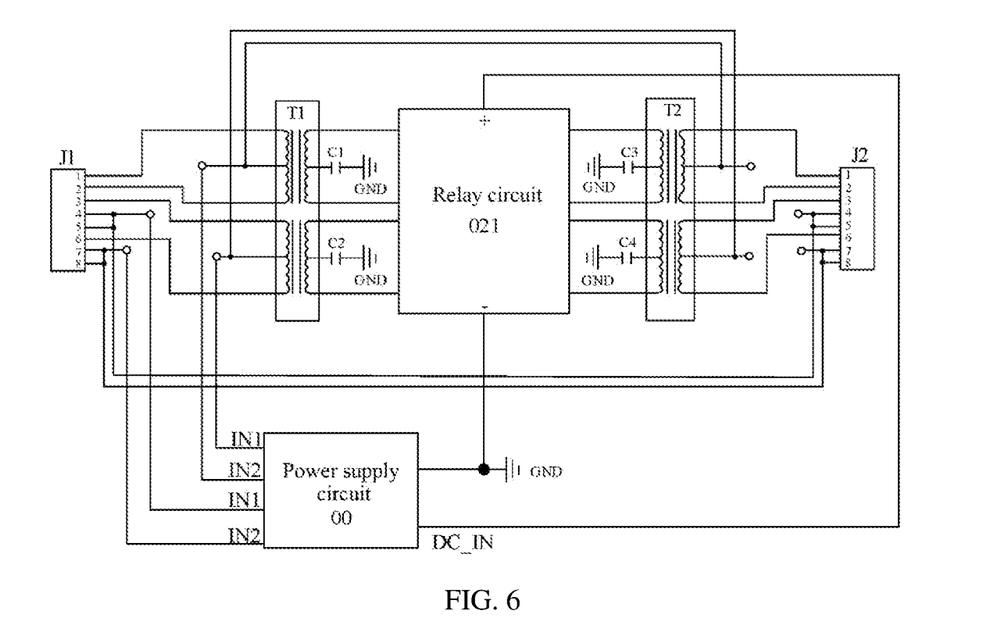
FIG. 6 is a schematic structural diagram of another delay device according to an embodiment of the present application.

FIG. 6 is a schematic structural diagram of another relay device according to an embodiment of the present application. As shown in FIG. 6, the relay device may further include: a first transformer T1 and a second transformer T2. The relay circuit 021 is connected to the input interface J1 of the relay device through the first transformer T1, and connected to the output interface J2 of the relay device through the second transformer.

Optionally, the relay circuit 021 may include two physical layer (PHY) chips communicating with each other through interfaces such as a reduced media independent interface (RMII), a media independent interface (MII), a reduced gigabit media independent interface (RGMII) or a gigabit medium independent interface (GMII).

When the power supply circuit 00 supplies power to the relay circuit 021, the relay device can sequentially transmit data signals received by the input interface J1 to the output interface J2 through the first transformer T1, the relay circuit 021, and the second transformer T2, and then transmit the data signals to the powered device to be forwarded.

With reference to FIG. 6, it can also be seen that the relay device further includes capacitors C1 to C4. The capacitor C1 has its ends connected to the first transformer T1 and the negative supply pin GND, the capacitor C2 has its ends respectively connected to the first transformer T1 and the negative supply pin GND, the capacitor C3 has its ends respectively connected to the second transformer T2 and the negative supply pin GND, and the capacitor C4 has its ends respectively connected to the second transformer T2 and the negative supply pin GND. The capacitors C1 to C4 can be filter capacitors for filtering common-mode noise in the circuit.

In addition, as shown in FIG. 6, each pair of pins in the input interface J1 of the relay device can also be connected to a corresponding pair of pins in the output interface J2. For example, a pair of pins (4 and 5) in the input interface J1 can be connected to a corresponding pair of pins (4 and 5) in the output interface J2 through a wire; a pair of pins (1 and 2) in the input interface J1 can be connected to a corresponding pair of pins (1 and 2) in the output interface J2 through center taps of the transformer T1 and the transformer T2. Therefore, when the power supply circuit 00 does not supply power to the relay circuit, the relay device can transmit a detection signal and a classification signal between the power sourcing equipment and the powered device through a wire directly connecting the input interface J1 and the output interface J2.

At present, with the popularization of network, the area for network cabling becomes increasingly large. Developed networks facilitate people's lives, and network cables extend further. At present, an effective communication range of standard Ethernet is 100 m. Data signals will be attenuated if a network cable extend beyond this range. In view of this, a current network cable is typically relayed by a router, switch or HUB, so as to ensure that data signals transmitted by the network cable are less affected, such that the purpose of network extension can be fulfilled.

In the process of laying network cables, each router, switch or HUB can extend a network cable by 100 meters, thus allowing long-distance laying of the network cable. However, a current router, switch, or HUB has multiple pairs of interfaces, and a network cable can only use one of these multiple pairs of interfaces. Obviously, this will leave other interfaces of the router, switch, or HUB idle and unused. A problem of low interface utilization occurs from this. Moreover, routers, switches and HUBs are typically expensive, the use of which for network extension would cause a higher cost of network engineering. This is unacceptable for network operators or constructors.

Figure 7:
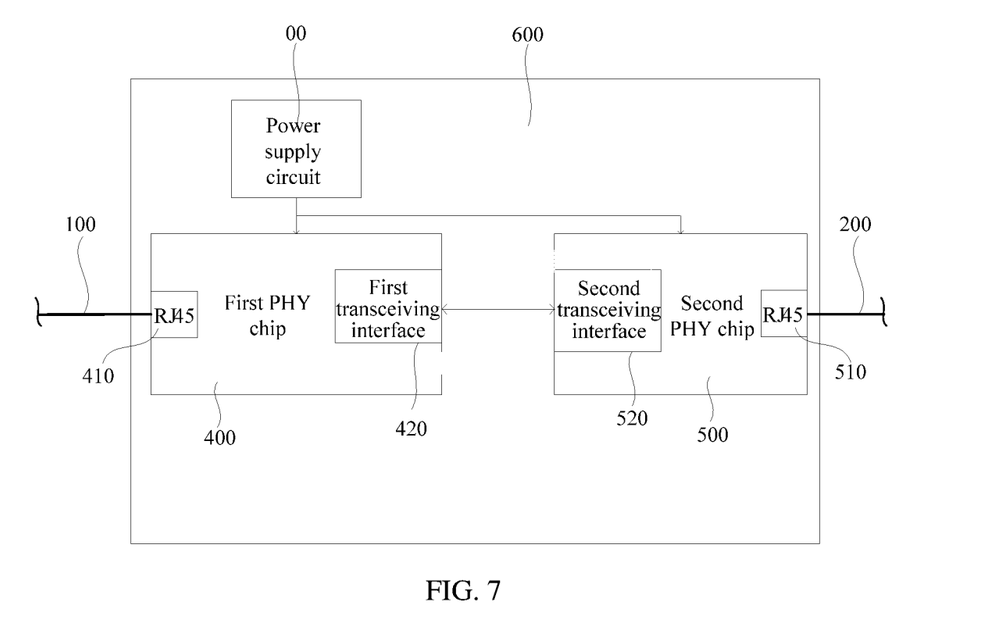
FIG. 7 is a schematic structural diagram of yet another delay device according to an embodiment of the present application.
Figure 8:
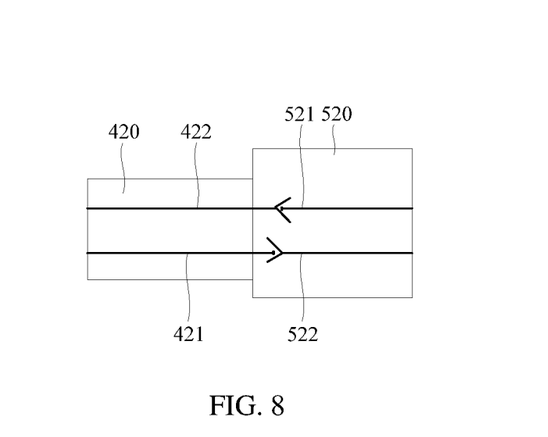
FIG. 8 is a schematic diagram of mating between a first transceiving interface and a second transceiving interface in a relay device according to an embodiment of the present application.
Figure 9:
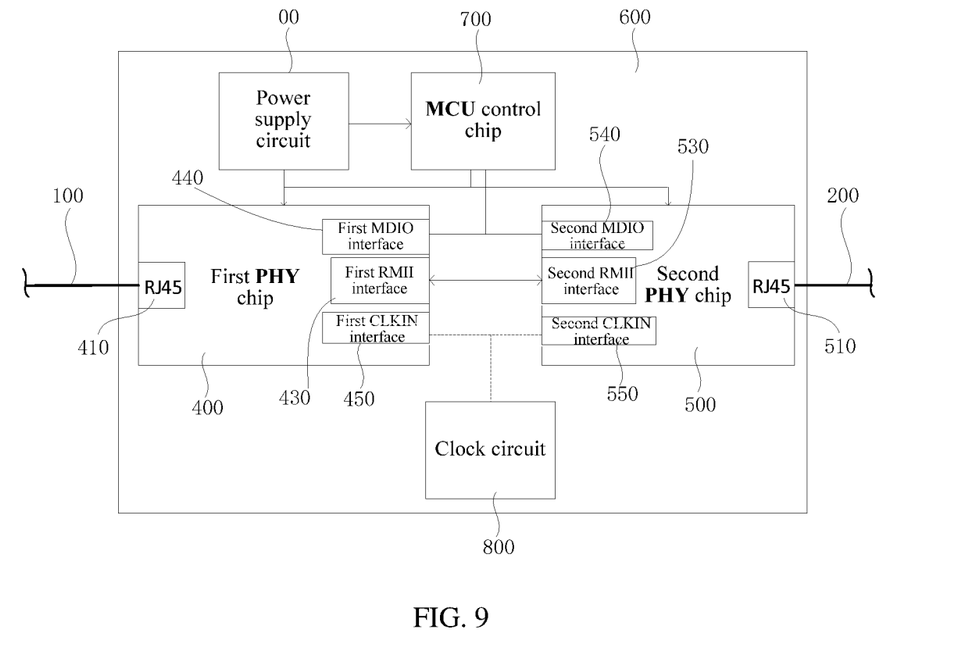
FIG. 9 is a schematic structural diagram of yet another delay device according to an embodiment of the present application.

In view of the above technical problems, an embodiment of the present application discloses a relay device, which may be a network extender. Referring to FIG. 7 to FIG. 9, the relay device is used for connecting a first network cable 100 and a second network cable 200. The disclosed relay device includes a first Physical Layer (PHY) chip 400 and a second PHY chip 500, and any one of the power supply circuits 00 described above.

The first PHY chip 400 is used for connecting with the first network cable 100, and the second PHY chip 500 is used for connecting with the second network cable 200. A data transmission interface 421 of the first PHY chip 400 is communicatively connected with a data reception interface 522 of the second PHY chip 500. A data reception interface 422 of the first PHY chip 400 is communicatively connected with the data transmission interface 521 of the second PHY chip 500. The power supply circuit 00 is electrically connected with the first PHY chip and the second PHY chip.

In the relay device disclosed in the embodiment of the present application, the first PHY chip 400 and the second PHY chip 500 communicate with each other through respective data transceiving interfaces. Therefore, the first network cable 100 connected with the first PHY chip 400 and the second network cable 200 connected with the second PHY chip are communicatively connected with each other. This communication connection between the first network cable 100 and the second network cable 200 allows network extension. The relay device can allow network extension through PHY chips, data transmission interfaces, and data reception interfaces. Compared with the routers, switches, and HUBs, this will undoubtedly reduce the cost and will not cause the problem of low interface utilization.

In one specific implementation, the first PHY chip 400 and the first network cable 100 can be connected through an RJ45 interface 410. Similarly, the second PHY chip 500 and the second network cable 200 can be connected through an RJ45 interface 510. The RJ45 interface is more common, readily available, and inexpensive.

For ease of connection, in a preferred implementation, the first PHY chip 400 includes a first transceiving interface 420, in which the data transmission interface 421 of the first PHY chip 400 and the data reception interface 422 of the first PHY chip 400 are integrated. Correspondingly, the second PHY chip 500 includes a second transceiving interface 520, in which the data transmission interface 521 of the second PHY chip 500 and the data reception interface 522 of the second PHY chip 500 are integrated. The first transceiving interface 420 is plugged and mated with the second transceiving interface 520, as shown in FIG. 8. The data transmission interface 421, the data reception interface 422, the data transmission interface 521, and the data reception interface 522 may be data interfaces such as pins and contact pins.

With the integrated structure described above, once the first transceiving interface 420 and the second transceiving interface 520 are engaged, the connection between the data transmission interface 421 of the first PHY chip 400 and the data reception interface 522 of the second PHY chip 500, and connection between data reception interface 422 of the first PHY chip 400 and the data transmission interface 521 of the second PHY chip 500 are simultaneously realized.

Both the first transceiving interface 420 and the second transceiving interface 520 may be selected from a group consisting of a Reduced Media Independent Interface (RMII), a Gigabit Medium Independent Interface (GMII), a Reduced Gigabit Media Independent Interface (RGMII) and a Media Independent Interface (MII). Specifically, referring to FIG. 9, in a specific implementation, the first transceiving interface 420 is a first RMII interface 430, and the second transceiving interface 520 is a second RMII interface 530.

Referring back to FIG. 7 and FIG. 9, the relay device disclosed in the embodiment of the present application may further include a housing 600. The first PHY chip 400, the second PHY chip 500, and the power supply circuit 00 may all be disposed in the housing 600, and sheltered by the housing 600. Typically, the network may be laid in a harsh environment. In a preferred solution, the housing 600 may be a housing made of a material resistant to corrosion and high temperature.

Referring to FIG. 9, the relay device disclosed in the embodiment of the present application may further include an Microcontroller Unit (MCU) control chip 700 connected to the first PHY chip 400 and the second PHY chip 500, and the MCU control chip 700 is used for controlling the initialization of the first PHY chip 400 and the second PHY chip 500, and matching network rates of the first PHY chip 400 and the second PHY chip 500.

The chip can be initialized under the arrangement of the MCU control chip 700 described above. Meanwhile, network rate matching between the first PHY chip 400 and the second PHY chip 500 can be ensured, such that a better data transmission effect can be achieved. Preferably, the MCU control chip 700 may also be disposed in the housing 600 to be protected by the housing 600.

Specifically, the first PHY chip 400 can be provided with a first Management Data Input/Output (MDIO) interface 440 connected to the MCU control chip 700, and the second PHY chip 500 can be provided with a second MDIO interface 540 connected to the MCU control chip 700. Of course, the first PHY chip 400 and the second PHY chip 500 can also be connected to the MCU control chip 700 by using other types of interfaces, which is not limited in this application.

Referring back to FIG. 9, the relay device disclosed in the embodiment of the present application may further include a clock circuit 800. The clock circuit 800 is connected to both the first PHY chip 400 and the second PHY chip 500, and used for synchronizing the data transmission between the first PHY chip 400 and the second PHY chip 500. This allows a better data transmission effect and ensures data transmission quality. Similarly, the clock circuit 800 can also be disposed in the housing 600 so as to be protected by the housing 600.

Specifically, the first PHY chip 400 can be provided with a first CLKIN interface 450 connected to the clock circuit 800, and the second PHY chip 500 can be provided with a second CLKIN interface 550 connected to the clock circuit 800. Of course, the first PHY chip 400 and the second PHY chip 500 can also be connected to the clock circuit 800 by using other types of interfaces, which is not limited in this application.

An embodiment of the present application provides a Power over Ethernet system. Refer to FIG. 1, the system may include a power sourcing equipment 01, a powered device 03, and a relay device 02. The relay device may be any one of relay devices shown in FIG. 3, FIG. 6, FIG. 7 and FIG. 9.

The input interface of the relay device 02 is connected to the power sourcing equipment 01, and the output interface of the relay device 02 is connected to the powered device 03. The transmission distance of the data signals between the power sourcing equipment 01 and the powered device 03 can be effectively extended through the relay device 02. Since the power sourcing equipment 01 can simultaneously supply power to the relay device 02 and the powered device 03, therefore, the cost of power wiring can be effectively saved.

The system may further include a first network cable and a second network cable connected by the relay device described in the above content.

Herein, the technical features in each of the preferred solutions can be combined to form a solution as long as they are not contradictory, and these solutions are within the scope disclosed in the present application.

Herein, each of the preferred solutions only focuses on the differences from other preferred solutions. The preferred solutions can be combined arbitrarily as long as there is no conflict, and the combined embodiments are also within the scope of this specification. Considering the simplicity of the text, the embodiments formed by the combination will not be described separately herein.

The description is only for preferred embodiments of the present application, and embodiments are not so limited. Any modifications, substitutions, improvements, etc., which are made within the spirit and principles of the present application, will fall into the protection scope of the present application.

What is claimed is:

1. A relay device for connecting a first network cable with a second network cable, comprising:
a relay circuit;
a power supply circuit for powering the relay circuit, comprising at least one rectifier module and a switch control module, wherein, each rectifier module has an input end connected to an input interface of the relay device, a positive output end connected to a positive supply pin, and a negative output end connected to a first end of the switch control module, wherein, the positive supply pin is connected to a positive terminal of the relay circuit; and the switch control module has a second end connected to a negative supply pin, and a control end connected to the positive supply pin, wherein, the negative supply pin is connected to a negative terminal of the relay circuit; and wherein, the switch control module allows conduction between the first end and the second end when the rectifier module outputs a voltage greater than a preset threshold; and
a first PHY chip connected to the first network cable and a second PHY chip connected to the second network cable; wherein, a data transmission interface of the first PHY chip is communicatively connected to a data reception interface of the second PHY chip, a data reception interface of the first PHY chip is communicatively connected to a data transmission interface of the second PHY chip, and the power supply circuit is connected to and powers the first PHY chip and the second PHY chip.

2. The relay device of claim 1, wherein, the first PHY chip is connected to the first network cable through an RJ45 interface, and the second PHY chip is connected to the second network cable through an RJ45 interface.

3. The relay device of claim 1, wherein, the first PHY chip comprises a first transceiving interface in which the data transmission interface and data reception interface of the first PHY chip are integrated; the second PHY chip comprises a second transceiving interface in which the data transmission interface and data reception interface of the second PHY chip are integrated; and the first transceiving interface is plugged and mated with the second transceiving interface.

4. The relay device of claim 3, wherein, the first transceiving interface and the second transceiving interface are selected from a group consisting of an RMII interface, a GMII interface, an RGMII interface and a MII interface.

5. The relay device of claim 1, wherein,
the relay circuit has a positive terminal connected to a positive supply pin of the power supply circuit, and a negative terminal connected to a negative supply pin of the power supply circuit.

6. The relay device of claim 5, further comprising a first transformer and a second transformer;
   the relay circuit is connected to the input interface of the relay device through the first transformer, and is connected to the output interface of the relay device through the second transformer.

7. The relay device of claim 1, further comprising a housing in which the first PHY chip, the second PHY chip, and the power supply circuit are disposed.

8. The relay device of claim 7, further comprising an MCU control chip, which is disposed in the housing, connected to the first PHY chip and the second PHY chip, and configured for controlling initialization of the first PHY chip and the second PHY chip and matching a network rate of the first PHY chip with that of the second PHY chip.

9. The relay device of claim 8, wherein, the first PHY chip is provided with a first MDIO interface connected to the MCU control chip, and the second PHY chip is provided with a second MDIO interface connected to the MCU control chip.

10. The relay device of claim 7, further comprising a clock circuit connected to both the first PHY chip and the second PHY chip, the clock circuit is provided in the housing, and is configured for synchronizing data transmission between the first PHY chip and the second PHY chip.

11. The relay device of claim 10, wherein the first PHY chip is provided with a first CLKIN interface connected to the clock circuit, and the second PHY chip is provided with a second CLKIN interface connected to the clock circuit.

* * * * *